3,407,155
AMINOTRIAZINE DECORATIVE, DIMENSIONALLY STABLE MOLDING COMPOUND CONTAINING A POLYMERIZED AROMATIC MONOMER AND HYDROXYL-CONTAINING VINYL MONOMERS COPOLYMER
George Sims Casebolt, Cheshire, Conn., assignor to American Cyanamid Company, Stamford, Conn., a corporation of Maine
No Drawing. Filed Oct. 29, 1965, Ser. No. 505,757
8 Claims. (Cl. 260—17.3)

ABSTRACT OF THE DISCLOSURE

An improved aminotriazine resin molding composition containing from about 2% to 14% by weight of the aminotriazine resin component of a copolymer of monovinyl aromatic monomers and certain hydroxyl containing vinyl monomers.

---

The present invention relates to a novel improved amino-triazine molding composition and resins derived therefrom which are characterized by excellent durability and sufficient internal stress relaxation to permit molding of large irregularly shaped molded articles. The invention also relates to heat and pressure consolidated articles, particularly irregularly shaped articles ranging from bottle warmers to electrical switch gear made with the use of the hereinbelow described novel and improved molding compositions.

The many excellent properties of aminoplast resins and in particular, melamine and benzoguanamine-melamine formaldehyde resins, have led to their widespread use in the molding and laminating field. For instance, these thermosetting resins possess, in the cured or thermoset state, hardness, color stability, and superior resistance to water and other solvents, which render them especially useful for the preparation of domestic and industrial molded articles.

However, such formed heat and pressure consolidated articles as switch gear components and washing machine agitators when molded into large complex configurations do have one deficiency which greatly detracts from their overall excellence. Articles of this type molded from melamine - formaldehyde or benzoguanamine-melamine formaldehyde resins, while quite hard are also quite brittle and will crack and craze appreciably under end use environment. This is particularly true in those instances where varied shaped molded objects are made which may be exposed to extreme variations in environmental conditions.

This propensity of melamine or benzoguanamine-melamine based conventionally prepared heat and pressure consolidated aminoplast resinous molded articles has limited the extent to which such articles have found acceptance in many important areas of everyday use. For instance, manufacturers of electrical switch gear have been reluctant to use this type resin in widespread operations because of the drawback of brittleness in the molded support which, if the part cracks, renders possible short circuiting of the entire system in which the molded part is employed.

I have now discovered that thermosetting resinous compositions comprising such amino-triazines as melamine, formoguanamine, acetoguanamine, substituted melamine and benzoguanamine-formaldehyde resin or combinations thereof blended with from 2 to 14 percent by weight of this resinous component of a free hydroxyl-containing copolymer obtained by polymerizing a vinyl aromatic monomer, e.g., styrene, with a hydroxyl containing vinyl monomer, e.g., allyl alcohol, can be cured to a substantially insoluble and infusible state to form hard durable craze resistant molded articles free of the above defects.

It is, therefore, an object of my invention to provide a novel means of rendering more durable large complex molded structures prepared by heat and pressure consolidation of melamine-formaldehyde or benzoguanamine-melamine formaldehyde resinous compositions.

It is also an object of my invention to proivde heat and pressure consolidated molded articles prepared from altered thermosetting aminoplast resinous compositions, particularly those prepared from durable improved melamine or benzoguanamine-melamine formaldehyde resinous compositions.

It is a further object of the present invention to provide novel thermosetting aminoplast compositions comprising melamine or benzoguanamine-melamine formaldehyde resinous material and about 2 to 14 percent of a free hydroxyl containing copolymer obtained by polymerizing a vinyl aromatic monomer, e.g., styrene, with a hydroxyl-containing vinyl monomer, e.g., allyl alcohol.

These and other objects of my invention will be discussed more fully hereinbelow.

The thermosetting resinous compositions employed in the practice of the present invention comprise blends of two essential ingredients. The first of these is an aminotriazine formaldehyde resin prepared by reacting, for example, melamine, benzoguanamine, and formaldehyde until a syrup is produced in which the mol ratio of the melamine to benzoguanamine in the charge is varied between about 1:0.55 and 1:0.825 and preferably 1:0.675 melamine to benzoguanamine, respectively. The mol ratio of melamine and benzoguanamine to formaldehyde in the initial charge may be varied between about 1:2.75 and 1:2.85, respectively and preferably 1:2.80 melamine and benzoguanamine to 1 mole of formaldehyde respectively. The resin syrup, thus produced, is substantially water soluble and ready for mixing with a suitable filler. This mixture is then dried and then further mixed with a curing catalyst, polymerization inhibitors and mold lubricants. Alternatively, the thermosetting resinous composition can be a melamine-formaldehyde resin, in which the mole ratio of melamine to formaldehyde may be varied from about 1.0 to 1.3 to about 1.0 to 3.0, respectively, and preferably between 1.0 to 1.4 and 1.0 to 2.0.

The second essential ingredient of my novel resinous composition is a free hydroxyl-containing copolymer containing from about 15% to about 85% by weight and preferably about 70% by weight based on the total weight of monomers in the copolymer of a vinyl aromatic monomer, and from about 15% to about 85% by weight and preferably about 30% by weight, based on the total weight of monomers in the copolymer of a hydroxyl-containing vinyl monomer. These polymers and means for their preparation are set forth in U.S. Patent 2,940,946 to Shokal et al. which disclosure in the interest of brevity of the present instrument is incorporated by reference herein.

I have found to be very suitable for my invention, commercially available styrene-allyl alcohol copolymers which contain about 70 parts by weight of the vinyl aromatic monomer styrene and 30 parts by weight of the hydroxyl-containing monomer allyl alcohol, said copolymer having a molecular weight of approximately 1150 to 1600, as measured by viscosity index.

Among the vinyl aromatic monomers which can be employed in preparing the free hydroxyl-containing copolymer are styrene, side chain substituted styrenes as $\alpha$-methyl styrene, $\alpha$-ethyl styrene and the like, ring substituted styrenes such as alkyl styrenes, e.g., o-methyl styrenes, m-ethyl styrenes and p-proply styrene, dialkyl styrenes, e.g., 2,4-dimethyl styrene and 2,5-diethyl styrene, halostyrenes, e.g., o-bromostyrene, p-chlorostyrene, 2,4-dichlorostyrene and 2,5-dibromostyrene, and vinyl naphthalene, e.g., β-vinyl naphthalene, and the like, as well as mixtures thereof. Styrene, due to its availability and low cost, is the preferred vinyl aromatic monomer.

A wide variety of hydroxyl-containing vinyl monomers may be employed in preparing the free hydroxyl-containing copolymer. However, an especially preferred class of hydroxyl-containing vinyl monomers encompasses those compounds represented by the general formula:

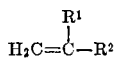

wherein $R^1$ represents a hydrogen atom, a halogen atom, i.e., fluorine, chlorine, bromine or iodine, an alkyl group having from 1 to 4 carbon atoms, inclusive, e.g., methyl, ethyl, n-propyl, n-butyl, and the like, or an aryl group, e.g., a phenyl group, and $R^2$ represents a hydroxyalkyl group, preferably a primary hydroxyalkyl group, having from 1 to 4 carbon atoms, inclusive, e.g., hydroxymethyl, 2-hydroxyethyl, 3-hydroxypropyl, 4-hydroxybutyl, and the like.

An illustrative, but by no means exhaustive enumeration of hydroxyl-containing vinyl monomers coming within the scope of the general formula given above includes such compounds as allyl alcohol, β-bromoallyl alcohol, β-chloroallyl alcohol, methallyl alcohol, β-phenylallyl alcohol, 3-buten-1-ol, 3-buten-2-ol, 4-penten-1-ol, 4-penten-2-ol, β-hydroxethyl acrylate, β-hydroxyethyl methacrylate, β-hydroxyethyl-2-ethyl-acrylate, β-hydroxyethyl-2-propylacrylate, β-hydroxyethyl-2-butylacrylate, β-hydroxyethyl-2-chloroacrylate, β-hydroxypropyl acrylate, γ-hydroxypropyl methacrylate, γ-hydroxypropyl-2-propylacrylate, γ-hydroxypropyl - 2 - butylacrylate, γ-hydroxypropyl-2-bromoacrylate, γ-hydroxybutyl acrylate, γ-hydroxybutyl methacrylate, γ-hydroxybutyl-2-ethylacrylate, δ-hydroxybutyl - 2 - butylacrylate, δ - hydroxybutyl-2-butylacrylate, δ-hdroxybutyl-2-chloroacrylate, and the like, as well as mixtures thereof. Of these monomers, allyl alcohol is preferred.

These hydroxyl-containing vinyl monomers, as well as methods for their preparation, are well-known in the art. Thus, for example, one method for the peparation of the above-described hydroxyalkyl acrylates and alkacrylates involves reacting acrylic acid or the appropriate substituted acrylic acid, or a suitable ester thereof, with an alkane diol. Another method involves the reaction of acrylic acid or the appropriate substituted acrylic acid with a lower alkylene oxide, such as ethylene oxide, propylene oxide, and the like.

In preparing the novel composition of my invention, where the amino-triazine component is benzoguanamine-melamine, for example, one reacts melamine, benzoguanamine, and formaldehyde in the relative proportions indicated above until a syrup is produced. This syrup, thus produced, is substantially water-soluble and is then introduced into a mixing vessel with a suitable fibrous filler such as chopped alpha-cellulose and after thorough blending, the impregnated filler is then dried. The material leaves the oven in coarse granular form referred to in the art as "popcorn." The amount of cellulose filler which is blended with the resin syrup to produce the melamine-benzoguanamine-formaldehyde popcorn may be varied between about 25% and 35% by weight based on the total weight of the popcorn. The drying step for this popcorn is conventionally accomplished in a continuous type oven on an endless belt in contact with hot air. The resin impregnated filler is dried to a volatile content of less than about 10%.

To this dried "popcorn" is added the free hydroxyl containing copolymer obtained by polymerizing a vinyl aromatic monomer with a hydroxyl containing vinyl monomer, which is a dry flaky material when added and which should in quantity comprise preferably 2 to 14 percent by weight of the aminotriazine resinous component. If substantially more than this critical amount is added, the quantity of the vinyl component will exceed that quantity which may physically be dispersed within the amino resin component molecular structure and will "bloom" out on the surface. By the term "bloom" we mean to refer to that migration of a component to the surface of the molded article detracting from its appearance and utility. Also, under these conditions, the characteristics of the thermoplastic component of this composite of thermosetting thermoplastic resinous materials becomes so predominent as to degrade the hardness and the thermosetting nature desired in this kind of molding composition. If less than this quantity of copolymer is added, the beneficial advantages noted above drop off very fast as the copolymer is reduced. The two materials are admixed by dry blending in a ball mill wherein the two ingredients are comilled for from about 3 to 4 hours. Just before the end of this milling period, raw unimpregnated alpha-cellulose fibers in amounts of about 3 to 4 percent of by weight of the total batch of material being admixed may be added. The total dry composition is then ground, milled and blended in a single operation for an additional 30 minutes. The essential purpose of the grinding and blending operation is to comminute the material to a fine particle size in the order of about 20–30 microns and at the same time uniformly blend the two resin systems with each other and with the cellulose fibers.

In the present day practice of preparing high-grade decorative molding compositions, a ball-milling process for milling the "popcorn" and blending the pigment therewith is customarily observed. A ball-mill is a rotatable drum-like piece of equipment which carries a charge of flint or porcelain balls of the same or varying diameters. The mill is ordinarily filled to a depth of about ½–⅔ of its diameter with these grinding balls. The material to be comminuted fills the interstices between the balls and part of the free space above. As the mill rotates, all of the balls are set in motion and a substantial portion of the molding composition and balls rises along the wall of the drum to the top and cascades over the remaining portion. It is this type of action that uniquely permits the ball-mill process to mill and blend concomitantly in a single operation.

Material which has been properly blended, leaves the ball-mill in a form of a very fluffy powder possessing a bulk density in the order of 0.25 g./cc. or less. This form of the composition is unsuitable for use directly as a molding material for several reasons. First, because of its exceedingly bulky characteristics, inordinately large and expensive molds would be required. Second, besides difficulties involved in handling a powder of this type, high dust losses are experienced which pose economical disadvantages. Accordingly, the art recognizes the requirement for densifying the ground, milled and blended material.

There are various ways practiced by the prior art for suitably increasing the bulk density of the product leaving the ball-mill. These include the use of such devices as the Banbury mixer, preform machines, and the like. A recent development in the art of densification, involves the use of pressure rolls to densify the product of the ball-mill. Briefly stated, densification by the pressure roll method involves feeding the ground, milled and blended powder through a set of juxtaposed pressure rollers to yield a compacted form of the powder. Regardless of the type of densification employed, the density of the composition is to be increased to at least about 1.0 g./cc. and preferably above 1.2 g./cc.

After proper densification of the composition as stated, the material is then granulated. Granulation is essentially a practical requirement in that it facilitates the handling of the composition by the molder. Nevertheless, the extent of granulation is not completely arbitrary as it is known to those skilled in this art that the granular is required to have a minimum degree of density usually expressed as apparent density. Generally granulated compositions designed for decorative applications should possess an apparent density of at least about 0.6 g./cc. The concept of apparent density is a byword in the art; nevertheless, details concerning some may be found in ASTM D-1182-54.

The types of fillers which may be used in making such molding compositions are well-known in the art and include, in addition to the alpha-cellulose referred to hereinabove, such other fillers as wood flour, mineral fillers, asbestos fibers, glass fibers, chopped rag, walnut shell flour, and the like, among others. Reference may be made to the U.S. Patent No. 3,007,885, to Oldham et al., which shows some details of one mode of practice of this art and is incorporated herein by reference. There are, of course, other well-known fillers some of which will be noted below.

Where it is desirable to incorporate a major portion or even all of the filler as an inorganic filler, a somewhat different manufacturing process may be more practical. Reference here is made to the incorporation of fillers such as clay, mica, asbestos, aluminum oxide, glass, diatomaceous earth, silica, wollastonite, barium sulfate, and the like. The resinous syrup portion of a molding compound in this category would be prepared in the same manner as described above. However, this resin syrup would be dehydrated in the reaction vessel in which it was prepared or would be spray dried to remove the water portion. This dry resin would then be blended and ground in a ball-mill or other blender with the inorganic fillers to produce the desired degree of blending and comminution, along with suitable lubricants, curing agents, and pigments and the copolymer. It could then be densified and granulated by any of the common methods which prevail in the art.

As an alternate to this process, where inorganic fillers are incorporated, these fillers could be mixed with the resin syrup and the water content of the syrup then removed by cospray drying the resin and filler.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example I (Resinous Composition A).—Preparation of melamine-benzoguanamine resins Into a suitable reaction vessel equipped with thermometer, stirrer, and reflux condenser, there is introduced 2463 parts of a 44% aqueous solution of formaldehyde, 315 parts of water, 1.65 parts of triethylamine (to give a pH of about 9.0), and 2274 parts of benzoguanamine. This slurry is heated to 200° F. whereupon the solution becomes clear in about 5 minutes. 977 parts of melamine are introduced into the contents of the reaction vessel and heating continued at 200° F. After 5 to 10 minutes at this temperature cool the syrup to 145–150° F. Then add 5.4 parts of $MgBr_2 \cdot 6H_2O$ and transfer contents of reaction vessel (the resin syrup) to a heavy duty kneading type mixer. Add 1858 parts of α-cellulose pulp and mix with the resin syrup for about 20 minutes at about 145° F. Transfer product to a continuously moving screen dryer in a bed thickness of about 3 inches and dry at a temperature of about 220° F. until the free water content is reduced to about 1%.

In addition to the amino-triazine enumerated in the several illustrative examples herein, it should be understood that our invention in its product concept is not limited to melamine-benzoguanamine and mixtures thereof, but is equally applicable to other amino-triazines such as melamine, acetoguanamine, formoguanamine, combinations of any of these as well as any of the various substituted amino-triazines presently in use in the plastics and resins industry.

Compounding of Resinous Composition A
(melamine-benzoguanamine)

To 2940 parts of the dried melamine-benzoguanamine formaldehyde resin (Resinous Composition A), prepared in the manner indicated in the above preparation, is added 60 parts of a commercially available copolymer of styrene (70%) allyl alcohol (30%) which is in the form of small dry flakes which have been broken down to the approximate particle size of the melamine-benzoguanamine-formaldehyde popcorn, along with pigment, lubricant, and curing agents, such as phthalic anhydride for purpose of blending and comilling in the ball mill in which they are placed and in which they remain for about 4 hours all things being considered. After the ingredients have been thoroughly blended and admixed and reduced in particle size, 90 parts of a fibrous α-cellulose pulp may be introduced into the ball mill and the entire batch further ground for about 30 minutes to form a fluffy powder which is densified by passage between a set of juxtaposed pressure rolls to obtain a compacted molding powder. This molding powder is granulated and then it is molded into various shaped articles by conventional molding techniques. These articles were then tested and compared for quality improvement against articles of the same shape but prepared from standard commercially available melamine-formaldehyde resins. The results of such testing are tabulated in Table I below. The Test Sample A is the new composition and Test Sample B is a standard commercially available melamine formaldehyde resin. These results tabulated are to wit:

TABLE I

| Test | Test Sample A, Resinous Composition A | Test sample B (Typical Data on Standard Commercially Available Melamine Formaldehyde Resin) |
|---|---|---|
| 1. Transfer molded inserts (⅛″ plastic ring molded around 1¾″ circular steel insert): | | |
| a. Before stoving | OK | Failure—plastic ring broken. |
| b. Hours of stoving at 220° F. before plastic ring breaks. | 2 to 4 | Zero. |
| 2. Circuit breaker stoving at 300° F., hours before cracks develop. | 50 to 80 | 2 to 4. |
| 3. Shrinkage (total), mils per inch | 17 to 19 | 15 to 17. |

To appreciate fully the significance of the test numbers presented in Table I and to appreciate the significance of my novel formulation to the amino molding compound industry in general, one should recognize that as amino resins cure, water is chemically generated, it migrates to the surface of the piece, and is lost through evaporation. As this cure progresses, shrinkage occurs and it is this shrinkage which places the finished molding under stresses. It is because of these stresses that the size and configuration of moldings made from amino resins have been limited to relatively small sizes and very simple configurations. Referring now to the data in Table I, shrinkage of my novel formulation (Test Sample A) is greater than that experienced with Test Sample B (a typical standard commercially available amino resin) yet, the utility of Test Sample A is prolonged many times over that of Test Sample B. The stoving technique (aging at elevated temperature) has been used to demonstrate the greater useful life of Test Sample A for it accelerates the development of stresses that would occur over a period of time in a commercial molding and, in addition, the stoving technique is a generally recognized method for evaluating this characteristic of amino molding compounds by those skilled in this art.

Example II (Resinous Composition B).—Preparation of melamine-formaldehyde resin

Into a suitable reaction vessel equipped with thermometer, stirrer, and reflux condenser, charge 3620 parts of 44% low methanol formalin, 2.65 parts of triethylamine, and 3360 parts of melamine and heat this slurry to reflux. By the time the melamine reacts to produce a clear, resinous syrup, the pH of this syrup should be about 9. Reflux this syrup for approximately 15 minutes, then cool to approximately 140° F. Transfer this resin syrup to a heavy duty mixer and mix thoroughly with 1880 parts of α-cellulose. This mixture is then spread uniformly in about a 3 inch thick cake on the belt of a continuous dryer and dried at approximately 200° F. until the free water content is reduced to about 1 percent.

Compounding of Resinous Composition B (melamine-formaldehyde)

3000 parts of melamine-formaldehyde resin prepared in the manner indicated in the above preparation are placed in each of a series of ball mills. To each was added 4.5 parts of phthalic anhydride, 3.0 parts of hexamethylenetetramine, 18 parts of zinc stearate, and the styrene-allyl alcohol copolymer as indicated in Table II. These mills were turned for 16 hours to blend the components and reduce them to uniform fine powders. These powders were then densified by conventional means and cut to standard granular sizes for molding. Test Sample C, containing no styrene-allyl alcohol copolymer, demonstrates the relatively poor durability of the unmodified system. In contrast, the addition of the minor amounts of the styrene-allyl alcohol copolymer definitely increases the time under stress before failure occurs. The quantities of resinous copolymer were varied in Test Samples D, E, and F as indicated in Table II and are compared against Test Sample C which has no copolymer added.

TABLE II

| | Resinous Composition B | | | |
|---|---|---|---|---|
| Test Sample | C | D | E | F |
| Styrene-allyl alcohol copolymer content, percent of composition | 0 | 3 | 4 | 5 |
| Circuit breaker stoving at 300° F., hours before cracks develop | <5 | 8-10 | 56-70 | 56-70 |
| Shrinkage (total), mils per inch | 12.7 | 13.0 | 13.5 | 12.5 |

Example III (Resinous Composition C).—Preparation of low ratio melamine formaldehyde resin Into a suitable reaction vessel equipped with thermometer, stirrer, and reflux condenser, there is introduced 143 parts of 44% low methanol formalin, 55.14 parts of water, 187.79 parts of melamine and 0.29 part of triethylamine. The pH of this slurry should be about 9.0 units. The batch is heated to reflux in about 30 minutes and maintained at this temperature for 30 to 45 minutes. Although, the solution does not become clear under these conditions, it is possible to determine the hydrophobe solids content which should at this point be approximately 25 to 35%. This resin syrup is cooled to about 150° F. and added to 95 parts of chopped alpha-cellulose in a heavy duty mixer. After 20 minutes of intensive mixing, the resin impregnated cellulose is dried on a porous moving belt traveling through a dryer heated to about 200° F. Drying is continued until the free water content of the resin impregnated pulp is reduced to about 1%.

Compounding of Resinous Composition C with copolymer 65 parts of the melamine-formaldehyde α-cellulose product prepared above (Resinous Composition C) is introduced into a ball mill. To this is added 3.26 parts (5.0% based on the melamine-formaldehyde α-cellulose product weight) of a styrene-allyl alcohol copolymer, 0.39 part of zinc stearate, 0.13 part of magnesium oxide, and suitable pigments to produce the desired color. These ingredients are ball milled for a period of 3 to 8 hours and the resulting powder densified and granulated by conventional means. Test Sample H of Table III containing 5 percent of styrene-allyl alcohol copolymer shows the improved durability of this formulation as compared with Test Sample G, made from the same Resinous Composition C but without the styrene-allyl alcohol copolymer. Test Sample J is similar to Test Sample H except it contains 10% of the styrene-allyl alcohol copolymer component.

TABLE III

| Test Sample | G | H | J |
|---|---|---|---|
| Styrene-allyl alcohol copolymer content, percent added to base mix | 0 | 5 | 10 |
| Bottle warmer base stoving at 300° F., hours before cracks develop | 2-8 | 8-23 | 8-23 |

Example IV (Resinous Composition D).—Preparation of melamine-formaldehyde resin

Into a suitable reaction vessel equipped with thermometer, stirrer, and reflux condenser, is introduced 1909 parts of 44% low methanol formalin, and approximately 3.3 parts of triethylamine. The pH of this solution should be approximately 9.0. 740 parts of water are added and then 2520 parts of melamine. This slurry is heated to reflux and refluxed for about 30 to 45 minutes. Although the solution is still not completely clear at this point, the batch is cooled to about 150° F. This syrup is dehydrated by pumping through a spray dryer under conditions of approximately 300° F. air inlet temperature, 200° F. outlet air temperature. The feed rate depends primarily on the size of the drying chamber, ranging from less than a pound of product per minute for a laboratory size spray dryer to about 50 pounds per minute for a commercial size unit. Limitations to the operation of the spray dryer are recognized by those engaged in this type of drying of amino resins. Too high a feed rate will permit atomized particles of the partially dried resin syrup to reach the walls of the drying chamber where they will accumulate and fuse to the chamber walls. Too low a feed rate will not remove sufficient of the heat from the air stream through the evaporation of the water content of the resin syrup. Under these conditions, the dried resin will be carried out of the drying chamber into the collector system at a temperature above the fusion point of the dried resin and the product will fuse to the walls of the collector system. Proper balance of temperature and rate of resin syrup fed to the dryer must thus, be maintained. This is understood by those engaged in this industry so presents no problem to one skilled in this art in the preparation of my Resinous Composition D.

Compounding of Resinous Composition D with copolymer

Into a series of porcelain lined ball-mills of a suitable size are introduced 960 parts of Resinous Composition D, 2040 parts of the mineral filler wollastonite, the various quantities of a styrene-allyl alcohol copolymer as indicated in Table IV, 12 parts of zinc stearate, 3 parts of glyceryl-monostearate, 12 parts of phthalic anhydride, and suitable quantities of pigments to give the desired color. These components are blended and ground for 4 hours. The powder, thus produced is then molded under conventional molding conditions, and tested with the results as indicated in Table IV.

TABLE IV

| Test Sample | K | L | M | N |
| --- | --- | --- | --- | --- |
| Styrene-allyl alcohol copolymer content, percent added to base mix | 0 | 2½ | 5 | 7½ |
| Test 1. Transfer molded inserts (⅛″ plastic ring molded around 1¾″ circular steel insert): | | | | |
| a. Before stoving | (¹) | OK | OK | OK |
| b. Hours of stoving at 220° F. before plastic ring breaks | 0 | 3–5 | 3–5 | 5–7 |

¹ Failure (plastic ring broken).

As will be noted from the above data, the new material has satisfactory ratings in the "Circuit Breaker Test," "Transfer Molded Insert Test." These tests will be briefly explained as follows:

Simulated circuit breaker test

Material is molded in a specially designed 4″ diameter x 1″ high flash type mold containing two parallel ribs which extend across the hollow section ¾″ on each side of the center. Each rib contains three bosses, one being ⅜″ in diameter, a second being 7/16″ in diameter, and the third being 9/16″ in diameter. Two other bosses are spaced between the ribs, one being ⅝″ in diameter and the other being ¾″ in diameter. A 9/16″ diameter aluminum insert is molded into each boss. Molding is done in a compression press at 310° F., using an electronically preheated preform of the material, at 25 tons pressure on the piece.

Moldings are cooled to room temperature, inspected, and then placed in the aging oven and inspected at frequent intervals for cracking.

Transfer molded insert test

The molding compound is transfer molded around a cylindrical steel insert 1¾″ in diameter x 7/16″ high placed concentrically in a mold cavity which is 2″ in diameter x 7/16″ deep. Two small gate runners are used between the transfer pot and the mold. The transfer pot is 3 3/16″ in diameter, the pot and mold are maintained at 310–315° F., and 25 to 85 tons pressure are available on an 8½″ diameter ram in the press. Duplicate moldings are made from each sample.

Moldings are cooled down to room temperature and inspected for cracks in the molded ring. Sound moldings still containing the insert are then subjected to aging at elevated temperature and inspected frequently for cracks.

The bottle warmer base referred to in preceding Table III is a conventional commercial molding having a large irregularly shaped configuration. As such, it is an excellent vehicle for illustrating the advantages of my invention. However, it is employed purely to illustrate a very large general class of irregularly shaped molded objects now capable of being prepared using the product concepts of the present invention.

I claim:

1. A thermosetting aminoplast resinous molding composition comprising: (A) a thermosetting condensate of an aminotriazine-formaldehyde resin wherein the mol ratio of aminotriazine and formaldehyde is between 1:1.3 and 1:3.0 and wherein the aminotriazine and the formaldehyde are substantially the sole essential ingredients and (B) from about 2 to about 14% by weight of the aminotriazine resinous component of a free hydroxyl-containing copolymer consisting of 85 to 15% by weight of (1) a monovinyl aromatic monomer with 15 to 85% by weight of (2) a hydroxyl-containing vinyl monomer represented by the general formula:

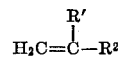

wherein R' represents a member selected from the group consisting of aryl, hydrogen, halogen, and a lower alkyl group of up to about 4 carbon atoms, and $R^2$ is a hydroxyl alkyl group having from 1 to 4 carbon atoms in copolymerized form, the total weight of (1) and (2) being based on the total weight of monomers in said copolymer.

2. A thermosetting aminoplast resinous composition of claim 1 which includes a substantial quantity of a filler.

3. A thermosetting aminoplast resinous composition according to claim 2, wherein the said filler is wollastonite.

4. A thermosetting aminoplast resinous composition according to claim 1, wherein the amino-triazine of component A is melamine, the monovinyl aromatic monomer is styrene and the hydroxyl-containing monovinyl aromatic monomer is allyl alcohol.

5. A composition of matter according to claim 1 wherein the amino-triazine of part (A) is a mixture of melamine and benzoguanamine and the monovinyl aromatic (1) is styrene and the hydroxyl-containing vinyl monomer (2) is allyl alcohol.

6. A composition of matter according to claim 5 which includes a substantial quantity of a mineral filler.

7. A composition of matter according to claim 6 wherein the said mineral filler is wollastonite.

8. A composition of matter according to claim 2 wherein the said filler is alpha-cellulose fibers.

References Cited

UNITED STATES PATENTS

| | | | |
| --- | --- | --- | --- |
| 2,897,174 | 7/1959 | Chapin et al. | 260—855 |
| 2,900,359 | 8/1959 | Chapin et al. | 260—855 |
| 2,940,946 | 6/1960 | Shokal et al. | 260—233 |
| 2,945,835 | 7/1960 | Chapin et al. | 260—856 |
| 3,007,885 | 11/1961 | Oldham et al. | 260—17.3 |
| 3,338,851 | 8/1967 | Taylor et al. | 260—17.3 |
| 2,579,985 | 12/1951 | Varela et al. | 260—67.6 |

OTHER REFERENCES

Chem. Abstract, 64:3777b, Nopco Chemical Co., "Porous Substrate Treatment."

Chem. Abstract, 64:892b, Monsanto Co., "Polymers Reinforced With Chemically Bonded Materials."

Chem. Abstract, 61: 1810e, Tourniaire, "Use of Fillers in Polyester Resins."

WILLIAM H. SHORT, Primary Examiner.

E. M. WOODBERRY, Assistant Examiner.

Dedication 3,407,155. —*George Sims Casebolt*, Cheshire, Conn. AMINOTRIAZINE DECORATIVE, DIMENSIONALLY STABLE MOLDING COMPOUND CONTAINING A POLYMERIZED AROMATIC MONOMER AND HYDROXYL-CONTAINING VINYL MONOMERS COPOLYMER. Patent dated Oct. 22, 1968. Dedication filed Mar. 4, 1983, by the assignee, *American Cyanamid Co.*

Hereby dedicates the remaining term of said patent to the Public.
[*Official Gazette May 31, 1983.*]